(12) United States Patent
Chen

(10) Patent No.: US 10,022,888 B2
(45) Date of Patent: Jul. 17, 2018

(54) FIREPROOF MATERIAL INCORPORATING AEROGEL WITH WOOD MATERIAL AND METHOD FOR MAKING THE SAME

(71) Applicant: Jean-Hong Chen, Tainan (TW)

(72) Inventor: Jean-Hong Chen, Tainan (TW)

(*) Notice: Subject to any disclaimer, the term of this patent is extended or adjusted under 35 U.S.C. 154(b) by 16 days.

(21) Appl. No.: 15/298,513

(22) Filed: Oct. 20, 2016

(65) Prior Publication Data

US 2018/0111287 A1    Apr. 26, 2018

(51) Int. Cl.

| | |
|---|---|
| *B27K 3/52* | (2006.01) |
| *C09K 21/06* | (2006.01) |
| *C09D 5/18* | (2006.01) |
| *B01J 13/00* | (2006.01) |
| *B05D 1/02* | (2006.01) |
| *B05D 3/02* | (2006.01) |
| *B27K 3/36* | (2006.01) |

(52) U.S. Cl.
CPC ............ *B27K 3/52* (2013.01); *B01J 13/0091* (2013.01); *B05D 1/02* (2013.01); *B05D 3/0254* (2013.01); *B27K 3/36* (2013.01); *C09D 5/18* (2013.01); *C09K 21/06* (2013.01); *B05D 2203/20* (2013.01); *B27K 2240/30* (2013.01)

(58) Field of Classification Search
None
See application file for complete search history.

(56) References Cited

U.S. PATENT DOCUMENTS

2014/0194551 A1*   7/2014   Schaumburg ........ B01J 13/0091
                                                        523/122

* cited by examiner

*Primary Examiner* — Erma C Cameron
(74) *Attorney, Agent, or Firm* — Rosenberg, Klein & Lee

(57) ABSTRACT

A fireproof material incorporating aerogel with a wood material and a method for making the same are provided. The method is carried out as follows: A. a mixed solution of a precursor and an organic solvent is added with an acid catalyst and becomes an aerogel solution through hydrolysis; B. the aerogel solution is added with an aqueous alkali catalyst solution and forms an aqueous aerogel solution through condensation; C. a wood material is impregnated with the aqueous aerogel solution such that aerogel generated by gelation covers the wood material; and D. the wood material is dried and then shaped to produce a fireproof material. The fireproof material is highly proof against fire and can pass the limiting oxygen index test.

7 Claims, 5 Drawing Sheets

A. Add an acid catalyst into a mixed solution of a precursor and an organic solvent such that the mixed solution becomes an aerogel solution through hydrolysis.

↓

B. Add an aqueous alkali catalyst solution into the aerogel solution such that the aerogel solution forms an aqueous aerogel solution through condensation.

↓

C. Impregnate a wood material with the aqueous aerogel solution such that aerogel is generated through gelation and covers the wood material.

↓

D. Dry and then shape the wood material to form a fireproof material.

FIREPROOF MATERIAL INCORPORATING AEROGEL WITH WOOD MATERIAL AND METHOD FOR MAKING THE SAME

BACKGROUND OF THE INVENTION

1. Technical Field

The present invention relates to a fireproof material structure that is exceptionally heat-resistant and proof against fire, and a method for making the same.

2. Description of Related Art

Aerogel has many special properties such as low density, high porosity, large specific surface area, and low thermal conductivity, and is nowadays produced by sol-gel polymerization in the following manner. To begin with, a precursor such as alkoxysilane or methyl silicate is mixed with a water-containing organic solvent. Then, hydrolysis is catalyzed by adding an acid catalyst. Once hydrolysis takes place for a certain amount of time, an alkali catalyst is added to bring about condensation, during which a colloidal solution is produced. As the silicon dioxide molecules in the colloidal solution keep condensing and aggregating, a silicon dioxide gel is gradually formed.

Conventional aerogel solutions contain a large amount of ethanol (alcohol) molecules, so ethanol vapor is generated during the drying step of aerogel production. This raises serious safety issues in all kinds of manufacturing processes that make extensive use of aerogel, for the concentration of ethanol vapor in the drying environment may reach the critical value of gas explosion.

For example, U.S. Pat. No. 8,029,871, entitled "method for producing silica aerogel coating" and granted on Oct. 4, 2011, discloses a silica aerogel coating produced by reacting a wet gel obtained by hydrolysis and polymerization of alkoxysilane with an organic modifying agent to form organically modified silica, dispersing the organically modified silica by an ultrasonic treatment to form an organically modified silica dispersion, adding an ultraviolet-curable resin and a photo-polymerization initiator to the dispersion to prepare a silica aerogel coating liquid, applying the coating liquid to a substrate, and then irradiating the coated layer with ultraviolet rays. Similar aerogel formations are also disclosed in Published Taiwan Invention Patent Application No. 200835648 and Taiwan Utility Model Patent No. M426798.

The afore-cited prior art, however, does not disclose a fireproof material made by incorporating aerogel with a recycled wood material, or the steps and conditions required to make the same, or an improvement of such steps and conditions, or a solution to the foregoing safety issues resulting from ethanol vapor. The technical features and effects of the prior art cited above are therefore different from those of the present invention.

BRIEF SUMMARY OF THE INVENTION

While many patents and patent applications have disclosed applying aerogel to thermal insulation or porous-medium adsorption, none of them has disclosed making a fireproof material by impregnating recycled wood chips with aerogel. In view of this, the present invention provides a fireproof material incorporating aerogel with recycled wood chips and a method for making the same. By incorporating aerogel with recycled wood chips, the fireproof material of the present invention also combines the superior heat-insulating feature of porous silicate aerogel with such desirable qualities of recycled wood chips as low cost, excellent mechanical properties, and potential contribution to carbon dioxide reduction.

According to the present invention, a method for making a fireproof material incorporating aerogel with a wood material includes the steps of: A. adding an acid catalyst into a mixed solution of a precursor and an organic solvent in order for the mixed solution to undergo hydrolysis and become an aerogel solution, wherein the precursor is alkoxysilane or methyl silicate, the organic solvent is prepared by mixing water with ethanol, the mole ratio of the water to the ethanol ranges from 10:1 to 120:8, the mole fraction of the precursor in the mixed solution ranges from 9% to 16%, the mole fraction of the organic solvent in the mixed solution ranges from 84% to 91%, the mole ratio of the precursor to the acid catalyst is 1:0.1, and the hydrolysis takes 10 minutes such that the mole fraction of the precursor in the aerogel solution ranges from 9.1% to 16.66%, the mole fraction of the organic solvent in the aerogel solution ranges from 83.33% to 90.60%, and the mole fraction of the acid catalyst in the aerogel solution ranges from 0.003% to 0.3%; B. adding an aqueous alkali catalyst solution into the aerogel solution in order for the aerogel solution to undergo condensation and form an aqueous aerogel solution, wherein the aqueous alkali catalyst solution is prepared from an alkali catalyst and a water solution, and the mole ratio of the alkali catalyst to the water solution ranges from 0.003:16 to 0.2:180; and wherein in the aqueous aerogel solution formed by the condensation, the mole fraction of the precursor ranges from 0.32% to 7.07%, the mole fraction of the ethanol ranges from 1.61% to 21.20%, the mole fraction of the water solution ranges from 70.67% to 98.02%, the mole fraction of the alkali catalyst ranges from 0.05% to 1.06%, the mole ratio of the alkali catalyst to the acid catalyst is 3:1, and the condensation takes 10 minutes; C. impregnating the wood material with the aqueous aerogel solution in order for the aerogel to be generated by gelation and cover the wood material, wherein the gelation takes 3 minutes; and D. drying and then shaping the wood material to form the fireproof material.

The acid catalyst is a weak acid or a strong acid selected from acetic acid, citric acid, oxalic acid, phosphoric acid, hydrochloric acid, sulfuric acid, and benzenesulfonic acid, while the alkali catalyst is an alkali selected from $NH_4OH$, $NaOH$, $NaHCO_3$, $CaCO_3$ and $KOH$.

The wood material is one or a combination of wood chips, wood shavings, shaved wood particles, waste wood blocks, and wood scraps.

In step D, the drying temperature ranges from 25° C. to 105° C., and the drying time is at least 30 minutes.

The present invention also provides a fireproof material incorporating aerogel with a wood material, as made by the method described above. The weight ratio of the wood material to the aerogel is lower than 1:1. The percentage by weight of the aerogel in the fireproof material ranges from 0.5 wt % to 10 wt %. The volume ratio of the wood material to the aerogel is higher than 1:1.

The foregoing technical features have the following advantages:

1. Composed mainly of recycled wood chips, the fireproof material has a low production cost and is suitable for mass production and extensive use.

2. Integrating the superior heat-insulating property of porous silicate aerogel with the excellent mechanical properties of recycled wood chips, the fireproof material can be mass-produced under normal conditions (i.e., normal temperature and normal pressure), does not release toxic gases while burning, is safe and stable, and can serve as a fireproof, heat-insulating material for interior decoration, system cabinets, and wood partitions, or as a fire-resistant, heat-insulating material for buildings and industrial factories.

3. The time required for hydrolysis can be adjusted by changing the concentration of the acid catalyst, and the time required for condensation, by changing the alkali catalyst content. That is to say, the time required for production can be shortened as needed.

4. The drying process of the aerogel colloidal solution is carried out at normal temperature and normal pressure. Alternatively, a rapid evaporation drying process can be performed at 105° C. to minimize the drawbacks of fireproof materials whose production involves carbon dioxide supercritical drying, which is typically used for the conventional aerogel systems. The latter drying process helps enhance fireproofness and heat resistance of the recycled wood chips used.

5. As aerogel is incorporated with recycled wood chips by impregnation, a continuous aerogel protective film structure is formed in the pores of the wood chips as well as on the chip surface and is thus securely bound to, and kept from separating from, the chips.

6. The percentage by volume of the aerogel in the fireproof material can be adjusted by modifying the water and ethanol content of the aerogel solution. Moreover, as long as the mole fraction of the precursor in the aqueous aerogel solution is higher than 1.4%, the resulting material is heat-insulating and fireproof and can be used as a fireproof, heat-insulating material for green buildings.

7. The fireproof material can be produced with ease and at low cost because the wood chips can be fully incorporated with the aerogel without adding any flame retardant.

DETAILED DESCRIPTION OF THE INVENTION

Figure 1:
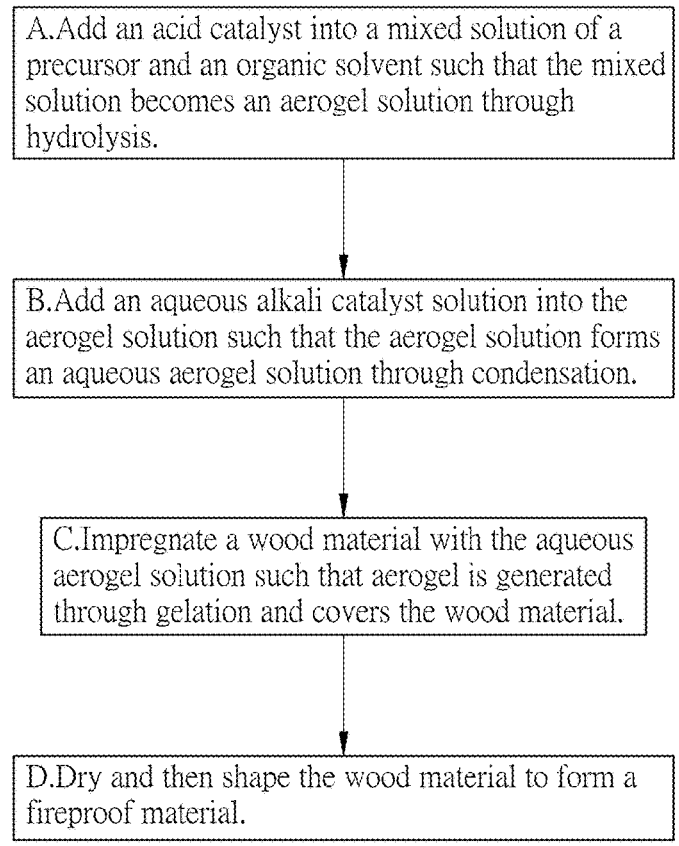
FIG. 1 is a flowchart showing the steps of the present invention.
Figure 2A:
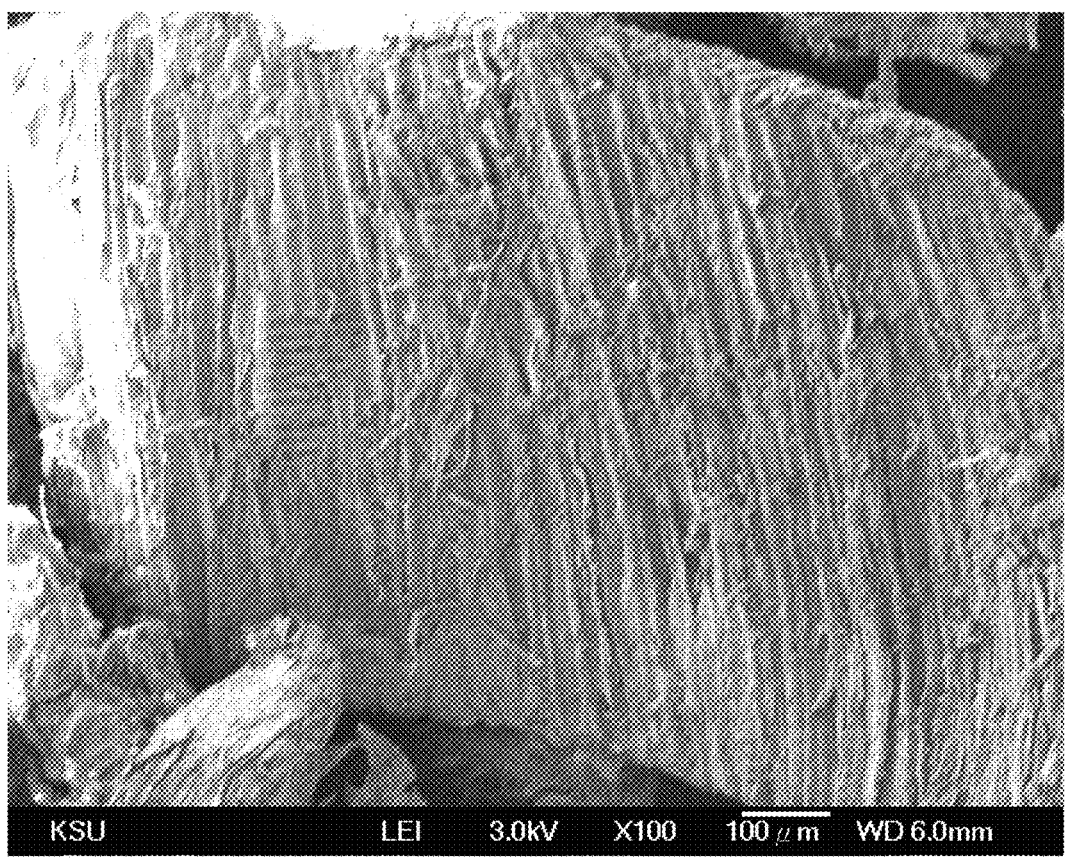
FIG. 2a-FIG. 2d shows electron microscope photos of a recycled wood chip before and after it is incorporated with aerogel according to an embodiment of the present invention to form a fireproof material.
Figure 2B:
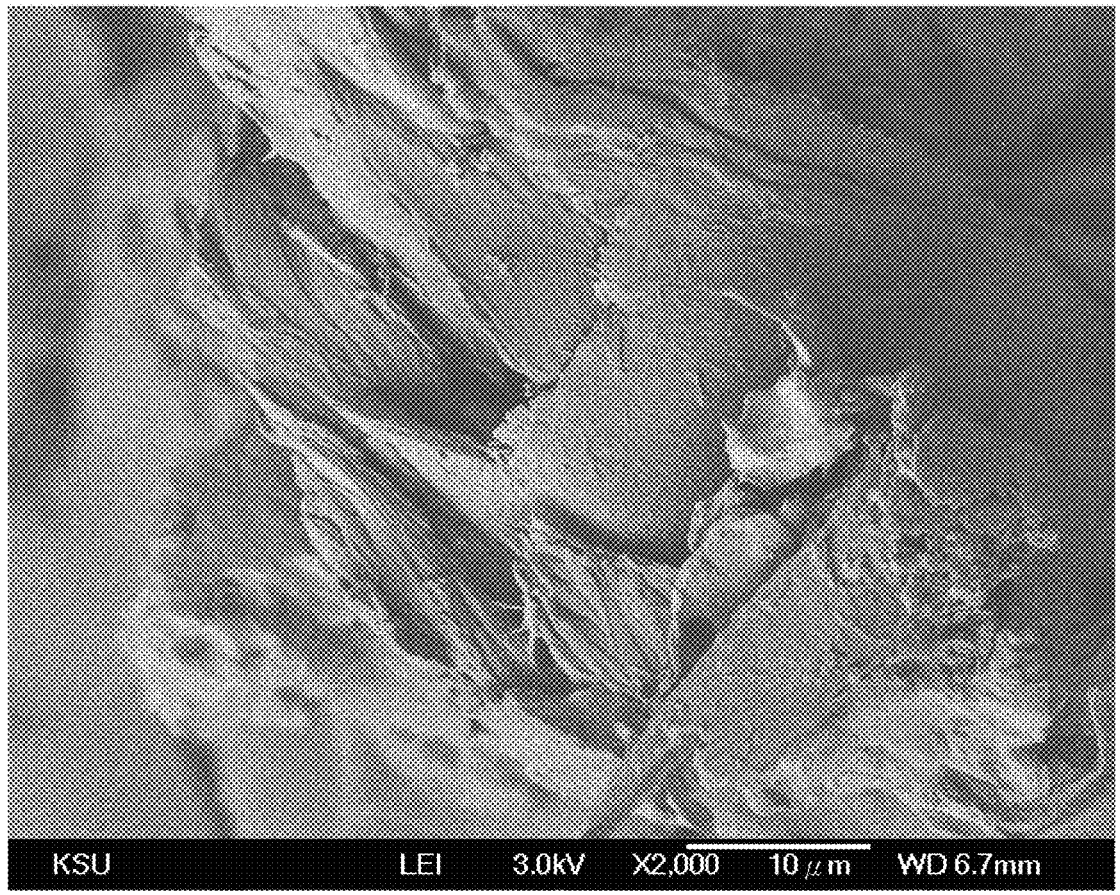
Figure 2C:
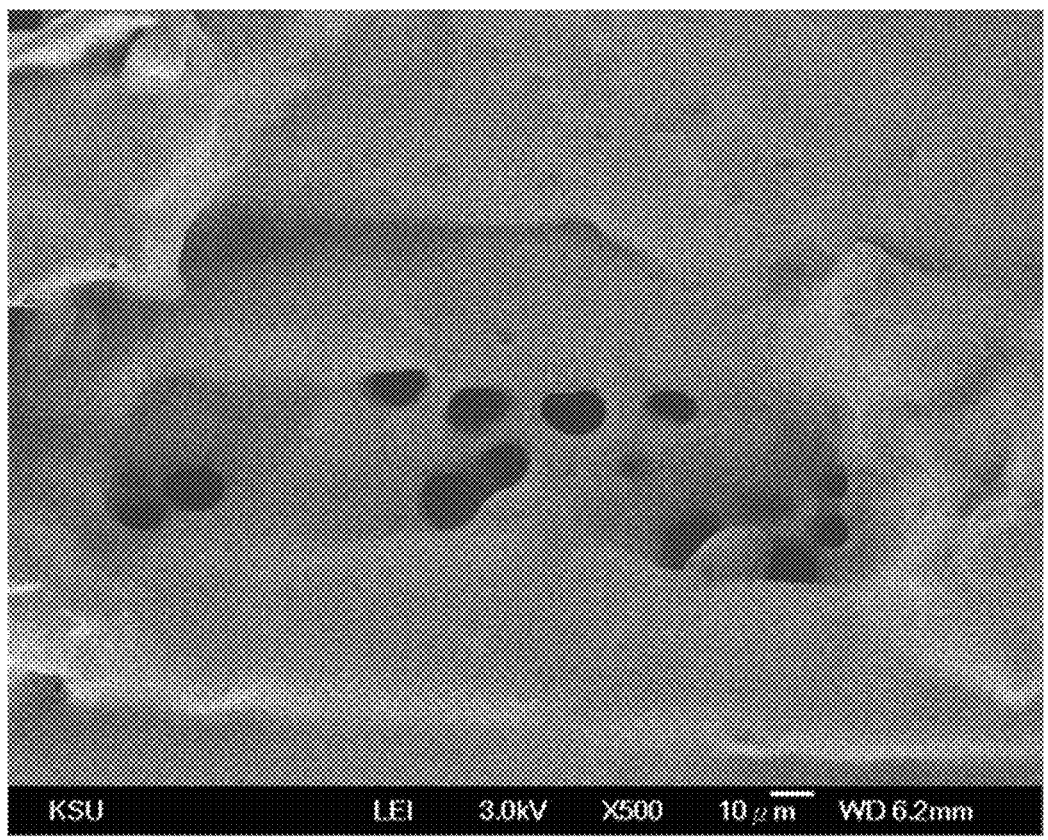
Figure 2D:
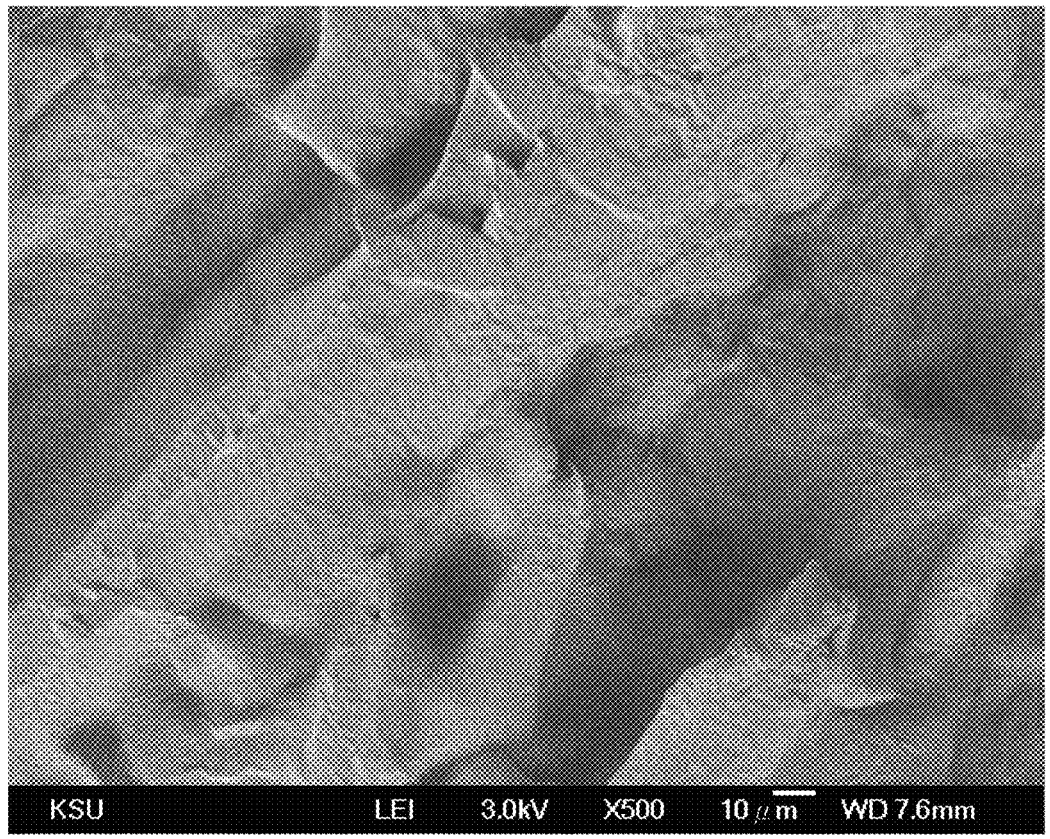

The present invention provides a method for making a fireproof material that incorporates aerogel with a wood material. According to an embodiment of the present invention as shown in FIG. 1, the method includes the following steps:

A. An acid catalyst is added into a mixed solution of a precursor and an organic solvent such that hydrolysis takes place, turning the mixed solution into an aerogel solution. In this embodiment, the precursor is alkoxysilane or methyl silicate, and the organic solvent is prepared by mixing water with ethanol, wherein the mole ratio of water to ethanol ranges from 10:1 to 120:8. The precursor and the organic solvent are sufficiently mixed by stirring to produce a mixed solution. Furthermore, the mole ratio of the precursor to the water in the organic solvent is higher than 1:4 to accelerate hydrolysis of the precursor. In other words, the mole fraction (mol %) of the precursor in the mixed solution ranges from 9% to 16% (based on 1 mole of precursor) while the mole fraction of the organic solvent in the mixed solution ranges from 84% to 91% (based on 5 to 10 moles of organic solvent).

Then, an acid catalysis is added into the mixed solution in order for the mixed solution to become an aerogel solution. The mole ratio of the precursor to the acid catalyst ranges from 1:0.001 to 1:0.1. The acid catalyst content influences the time required for hydrolysis. For example, the time required for hydrolysis is about 300 minutes when the mole ratio of the precursor to the acid catalysis is 1:0.001, and is about 10 minutes when the mole ratio of the precursor to the acid catalysis is 1:0.1. The mole fraction of the precursor in the aerogel solution ranges from 9.1% to 16.66% (based on 1 mole of precursor), the mole fraction of the organic solvent in the aerogel solution ranges from 83.33% to 90.60% (based on 5 to 10 moles of organic solvent), and the mole fraction of the acid catalyst in the aerogel solution ranges from 0.003% to 0.3% (based on 0.001 to 0.1 mole of acid catalyst).

The hydrolysis reaction occurs at room temperature while stirring continues. Preferably, the hydrolysis reaction lasts for 30 to 60 minutes. The time required for hydrolysis shortens as the mole ratio of the acid catalyst is increased. During the hydrolysis, water molecules react with the precursor (e.g., alkoxysilane or methyl silicate) to produce ethanol, thereby converting the system into an aerogel solution. The acid catalyst is a weak acid or a strong acid selected from acetic acid, citric acid, oxalic acid, phosphoric acid, hydrochloric acid, sulfuric acid, and benzenesulfonic acid.

B. An aqueous alkali catalyst solution is added into the aerogel solution such that condensation occurs, turning the aerogel solution into an aqueous aerogel solution. More specifically, the aqueous alkali catalyst solution is prepared from an alkali catalyst and a water solution, wherein the mole ratio of the alkali catalyst to the water solution ranges from 0.003:16 to 0.2:180. Once the aqueous alkali catalyst solution is added into the aerogel solution, the latter undergoes a condensation reaction and forms an aqueous aerogel solution. The alkali catalyst is an alkali selected from $NH_4OH$, $NaOH$, $NaHCO_3$, $CaCO_3$ and $KOH$. The water solution is one or a combination of pure water, filtered water, and water that has been treated twice. The alkali catalyst content influences the time required for condensation. For example, the time required for condensation is about 72 hours when the mole ratio of the alkali catalyst to the acid catalyst is 1:1, and is about 10 minutes when the mole ratio of the alkali catalyst to the acid catalyst is 3:1. The time required for condensation shortens as the mole ratio of the alkali catalyst is increased. In the aqueous aerogel solution formed by condensation, the mole fraction of the precursor ranges from 0.32% to 7.07% (based on 1 mole of precursor), the mole fraction of the ethanol ranges from 1.61% to 21.20% (based on 3 to 5 moles of ethanol), the mole fraction of the water solution ranges from 70.67% to 98.02% (based on 10 to 305 moles of water solution), and the mole fraction of the alkali catalyst ranges from 0.05% to 1.06% (based on 0.0015 to 0.15 mole of alkali catalyst).

C. A wood material is impregnated with the aqueous aerogel solution such that aerogel is generated by gelation and covers the wood material. More specifically, the wood material is soaked in the aqueous aerogel solution, allowing the aqueous aerogel solution to seep into the wood material sufficiently. Preferably, the wood material is recycled wood chips to lower production cost. Apart from recycled wood chips, the wood material may be made of one or a combination of recycled wood shavings, recycled shaved wood particles, recycled waste wood blocks, and wood scraps. The time required for gelation is about 1100 minutes when the mole ratio of the alkali catalyst to the acid catalyst is 1:1, and is shortened to about 3 minutes when the mole ratio of the alkali catalyst to the acid catalyst is 3:1, meaning the time required for impregnating the wood material can be controlled by adjusting the mole ratio of the alkali catalyst to the acid catalyst. In addition to impregnation, sufficient infiltration of the aerogel into the wood material can be achieved by spraying the wood material with the aqueous aerogel solution several times in succession.

D. The wood material is dried and then shaped to form a fireproof material. More specifically, the wood material obtained from the previous step (which is incorporated with the aqueous aerogel solution) is subjected to a drying process at normal temperature (25° C.) and normal pressure, wherein the drying process includes, for example, gluing, pressing into shape, and drying to stabilize the shape. As a result, a shaped fireproof material incorporating the aerogel with the starting wood material is obtained. Alternatively, a rapid evaporation drying process can performed at 105° C. to dry the aerogel colloidal solution, thereby minimizing the drawbacks of fireproof materials that are dried by carbon dioxide supercritical drying, which is typically used for the conventional aerogel systems. The alternative drying process helps enhance fireproofness and heat resistance of the wood material. If a conventional aerogel solution, which contains a large amount of ethanol (alcohol), is subjected to the drying process of step D of the present invention, ethanol vapor will form, and this can be very dangerous in the production process of a fireproof material incorporating aerogel with recycled wood chips if the concentration of ethanol vapor in the drying environment reaches the critical value of gas explosion. In light of the above, and to address the aforesaid safety issues, the present invention improves the production conditions of the aerogel solution required for making a fireproof material that incorporates aerogel with recycled wood chips.

The drying condition of step D is to let dry naturally at room temperature or to dry at a temperature ranging from 80° C. to 105° C. The intended fireproof material can be obtained, and a high yield rate, achieved, through a raid drying process that involves stirring at 105° C. for 30 minutes. The aerogel forms a stable aerogel film in the internal air chambers of the wood material that prevents the cellulose and lignin molecules of the wood material from burning rapidly in flames. More specifically, once recycled wood chips are impregnated and thus incorporated with the aqueous aerogel solution, a continuous aerogel protective film structure is formed in the pores of the wood chips and is thus firmly bound to, and kept from separating from, the wood chips. The manufacturing process described above is suitable for continuous industrialized mass production, which helps reduce production cost.

In step C, the aqueous aerogel solution is allowed to seep sufficiently into recycled wood chips such that the resulting aerogel is adsorbed to the chip surface and also into the pores of the chips. More specifically, once the recycled wood chips, which have a highly porous reticular structure, are impregnated with the aqueous aerogel solution, the aqueous aerogel solution gels in the pores of the recycled wood chips. The resulting aerogel, when dried, also forms a reticular structure with a vast number of tiny holes. Thus, the aerogel forms a porous reticular structure in the pores of the recycled wood chips as well on on the chip surface that serves as a protective film. Please refer to FIG. 2a-FIG. 2d, in which photo (a) shows a recycled wood chip in its original state while photos (b), (c), and (d) are microscopic pictures showing the modified surface of the recycled wood chip after aerogel is incorporated with the chip. The photos demonstrate that the gaps between the fibers of the recycled wood chip are filled with aerogel, and that an aerogel protective film is formed on the surface of the recycled wood chip, too. In addition, the impregnation step allows the aerogel content of the aerogel coating of the finished fireproof material to vary with the alkoxysilane or methyl silicate content of the aqueous aerogel solution used for impregnation. More specifically, when recycled wood chips are impregnated with an aqueous aerogel solution whose alkoxysilane or methyl silicate content (mole fraction) is low, the recycled wood chips are only partially protected by the resulting aerogel, meaning the original looks and properties of the recycled wood chips are kept to a certain extent while the aerogel imparts thermal insulation and fire resistance to the chips; the resulting fireproof material, therefore, can be used as a heat-insulating construction material for green buildings or a heat-insulating material for cars. By contrast, when recycled wood chips are impregnated with an aqueous aerogel solution whose alkoxysilane or methyl silicate content (mole fraction) is high, the recycled wood chips will be fully protected by the resulting aerogel such that better thermal insulation and higher fire resistance are provided; the resulting fireproof material, therefore, can be used as a fire-resistant, heat-insulating material for buildings or industrial factories. Besides, the water and ethanol content of the aerogel solution can be modified to adjust the percentage by volume of the aerogel in the finished fireproof material. As long as the mole fraction of the precursor in the aqueous aerogel solution is 1.4% or above, the finished fireproof material is heat-insulating and proof against fire.

Preferably, the fireproof material contains 0.5 wt % to 10 wt % of aerogel. When the mole ratio of the precursor in step A (i.e., alkoxysilane or methyl silicate) to the aqueous aerogel solution is 1:30, the volume ratio of the wood material (e.g., recycled wood chips) to the aqueous aerogel solution ranges from 1:085 to 1:1.5.

The material obtained from the drying process of step D can serve as a common flameproof material provided that the volume ratio of the wood material to the aerogel is lower than 1:1. This allows the aerogel to be used economically and production cost, under control. When the volume ratio of the wood material to the aerogel is higher than 1:1, the resulting material not only provides excellent thermal insulation but also is fireproof. According to test results, fireproof materials made according to the present invention by incorporating aerogel with recycled wood chips have an average LOI (limiting oxygen index) value higher than 50, feature grade-1 fireproofness and flame resistance, do not release toxic gases during combustion, are safe and stable, and can therefore be used as fireproof, heat-insulating materials for buildings. Also, a property test for green construction materials shows that fireproof materials made according to the present invention by incorporating aerogel with recycled wood chips have an average thermal conductivity (k) value of 0.12 W/m·k, which is lower than those of common wood boards and engineered wood panels and signifies outstanding thermal insulation. The limiting oxygen index (LOI) values and thermal conductivity (k) values obtained from the tests are tabulated as follows:

TABLE 1

Limiting oxygen index (LOI) and thermal conductivity (k) test results of fireproof material samples made according to an embodiment of the present invention

| | Sample | LOI value | K value |
|---|---|---|---|
| Fireproof materials incorporated with aerogel by complete impregnation | Whole-W1 | 51 | 0.121 |
| | Whole-W2 | 50 | 0.118 |
| | Whole-W3 | 50 | 0.117 |
| | Whole-W4 | 50 | 0.120 |
| | Whole-W5 | 51 | 0.122 |
| | Average value | >50 (fire-retardant material) | 0.120 |

The present invention also provides a fireproof material incorporating aerogel with a wood material as is made by the method described above. The fireproof material includes recycled wood chips and aerogel, wherein the aerogel is incorporated with the recycled wood chips to form an aerogel protective film structure. The fireproof material is flameproof (LOI>36) when the weight ratio of the recycled wood chips to the aerogel is lower than 1:1, and the fireproof/flameproof property of the fireproof material can be enhanced by increasing the weight ratio of the aerogel. Thus, in addition to thermal insulation, the fireproof material features an economical use of aerogel and low cost.

The present invention incorporates aerogel with recycled wood chips to produce a fireproof material that not only integrates the heat-insulating property of aerogel, which is porous, with the desirable properties of recycled wood chips, but also is mass-producible and has industrial applicability. Moreover, the acid catalyst content in the present invention can be modified to adjust the time required for hydrolysis, and the alkali catalysis content of the aerogel solution can be changed to adjust the time required for condensation and gelation, thereby controlling the time required for impregnating the recycled wood chips. The aerogel in the present invention seeps into the recycled wood chips and forms an aerogel protective film in the pores of the wood chips as well as on the chip surface such that the aerogel will not separate from the wood chips easily. Also, the fireproof material is highly proof against fire as long as the volume ratio of the recycled wood chips to the aerogel is higher than 1:1. Thus, by incorporating the aerogel with the recycled wood chips, the present invention provides a material qualifying as a heat-insulating and fireproof material for buildings.

The embodiments described above are but two preferred ones of the present invention and should not be construed as restrictive of the scope of patent protection sought by the applicant. All simple equivalent changes and substitutions made according to the appended claims and the disclosure of this specification should fall within the scope of the present invention.

What is claimed is:

1. A method for making a fireproof material incorporating aerogel with a wood material, the method comprising the steps of:
    A. adding an acid catalyst into a mixed solution of a precursor and an organic solvent in order for the mixed solution to undergo hydrolysis and become an aerogel solution, wherein the precursor is alkoxysilane or methyl silicate, the organic solvent is prepared by mixing water with ethanol, the mole ratio of the water to the ethanol ranges from 10:1 to 120:8, the mole fraction of the precursor in the mixed solution ranges from 9% to 16%, the mole fraction of the organic solvent in the mixed solution ranges from 84% to 91%, and the mole ratio of the precursor to the acid catalyst ranges from 1:0.001 to 1:0.1 such that the mole fraction of the precursor in the aerogel solution ranges from 9.1% to 16.66%, the mole fraction of the organic solvent in the aerogel solution ranges from 83.33% to 90.60%, and the mole fraction of the acid catalyst in the aerogel solution ranges from 0.003% to 0.3%;
    B. adding an aqueous alkali catalyst solution into the aerogel solution in order for the aerogel solution to undergo condensation and form an aqueous aerogel solution, wherein the aqueous alkali catalyst solution is prepared from an alkali catalyst and a water solution, and the mole ratio of the alkali catalyst to the water solution ranges from 0.003:16 to 0.2:180; and wherein in the aqueous aerogel solution formed by the condensation, the mole fraction of the precursor ranges from 0.32% to 7.07%, the mole fraction of the ethanol ranges from 1.61% to 21.20%, the mole fraction of the water solution ranges from 70.67% to 98.02%, and the mole fraction of the alkali catalyst ranges from 0.05% to 1.06%;
    C. impregnating the wood material with the aqueous aerogel solution in order for the aerogel to be generated by gelation and cover the wood material; and
    D. drying and then shaping the wood material to form the fireproof material.

2. The method of claim 1, wherein in the step A, the hydrolysis takes 10 to 300 minutes; when the mole ratio of the precursor to the acid catalyst is 1:0.001, the hydrolysis takes 300 minutes; and when the mole ratio of the precursor to the acid catalyst is 1:0.1, the hydrolysis takes 10 minutes.

3. The method of claim 1, wherein the acid catalyst is a weak acid or a strong acid selected from the group consisting of acetic acid, citric acid, oxalic acid, phosphoric acid, hydrochloric acid, sulfuric acid, and benzenesulfonic acid; and the alkali catalyst is an alkali selected from the group consisting of $NH_4OH$, $NaOH$, $NaHCO_3$, $CaCO_3$ and $KOH$.

4. The method of claim 1, wherein in the step B, the condensation takes 10 minutes to 72 hours; when the mole ratio of the alkali catalyst to the acid catalyst is 1:1, the condensation takes 72 hours; and when the mole ratio of the alkali catalyst to the acid catalyst is 3:1, the condensation takes 10 minutes.

5. The method of claim 1, wherein the wood material is one or a combination of wood chips, wood shavings, shaved wood particles, waste wood blocks, and wood scraps.

6. The method of claim 1, wherein in the step C, the gelation takes 3 to 1100 minutes; when the mole ratio of the alkali catalyst to the acid catalyst is 1:1, the gelation takes 1100 minutes; and when the mole ratio of the alkali catalyst to the acid catalyst is 3:1, the gelation takes 3 minutes.

7. The method of claim 1, wherein the step D uses a drying temperature ranging from 25° C. to 105° C. and a drying time of at least 30 minutes.

* * * * *